(12) United States Patent
Bhatti

(10) Patent No.: US 11,114,915 B2
(45) Date of Patent: Sep. 7, 2021

(54) INTEGRATED ROTOR YOKE

(71) Applicant: ZF Active Safety US Inc., Livonia, MI (US)

(72) Inventor: Irfan Bhatti, Farmington Hills, MI (US)

(73) Assignee: ZF Active Safety US Inc., Livonia, MI (US)

(*) Notice: Subject to any disclaimer, the term of this patent is extended or adjusted under 35 U.S.C. 154(b) by 137 days.

(21) Appl. No.: 16/587,088

(22) Filed: Sep. 30, 2019

(65) Prior Publication Data

US 2020/0112221 A1   Apr. 9, 2020

Related U.S. Application Data

(60) Provisional application No. 62/741,332, filed on Oct. 4, 2018.

(51) Int. Cl.
| | |
|---|---|
| *H02K 5/02* | (2006.01) |
| *H02K 7/00* | (2006.01) |
| *H02K 1/27* | (2006.01) |
| *H02K 5/04* | (2006.01) |
| *H02K 11/215* | (2016.01) |

(52) U.S. Cl.
CPC ............ *H02K 5/02* (2013.01); *H02K 1/27* (2013.01); *H02K 5/04* (2013.01); *H02K 7/003* (2013.01); *H02K 11/215* (2016.01)

(58) Field of Classification Search
CPC .......... H02K 11/21; H02K 29/06; H02K 5/02; H02K 1/27; H02K 5/04; H02K 7/003
USPC .................................................. 310/83, 68 B
See application file for complete search history.

(56) References Cited

U.S. PATENT DOCUMENTS

| | | | |
|---|---|---|---|
| 7,193,343 B2* | 3/2007 | Tsuge | H02K 5/15 |
| | | | 310/68 B |
| 7,350,283 B2 | 4/2008 | Won et al. | |
| 8,593,027 B2 | 11/2013 | Marchitto et al. | |
| 10,253,676 B2 | 4/2019 | Gossling et al. | |
| 2008/0174212 A1* | 7/2008 | Rudel | H02K 29/08 |
| | | | 310/68 B |
| 2013/0257189 A1* | 10/2013 | Blum | G01M 1/36 |
| | | | 310/51 |
| 2017/0317539 A1 | 11/2017 | Starke | |

FOREIGN PATENT DOCUMENTS

| | | |
|---|---|---|
| DE | 102008001539 A1 | 11/2009 |
| DE | 102012202529 A1 | 8/2013 |
| EP | 2632035 B1 | 8/2019 |
| JP | 2000152524 A | 5/2000 |
| JP | 3589266 B2 | 8/2004 |
| WO | 2017133784 A1 | 8/2017 |

* cited by examiner

*Primary Examiner* — Terrance L Kenerly
(74) *Attorney, Agent, or Firm* — Robert James Harwood

(57) ABSTRACT

A rotor yoke includes a casing attachment ring, a sensor ring, and an over-molded body disposed between the casing attachment ring and the sensor ring. The over-molded body couples the sensor ring to the casing attachment mechanism.

8 Claims, 9 Drawing Sheets

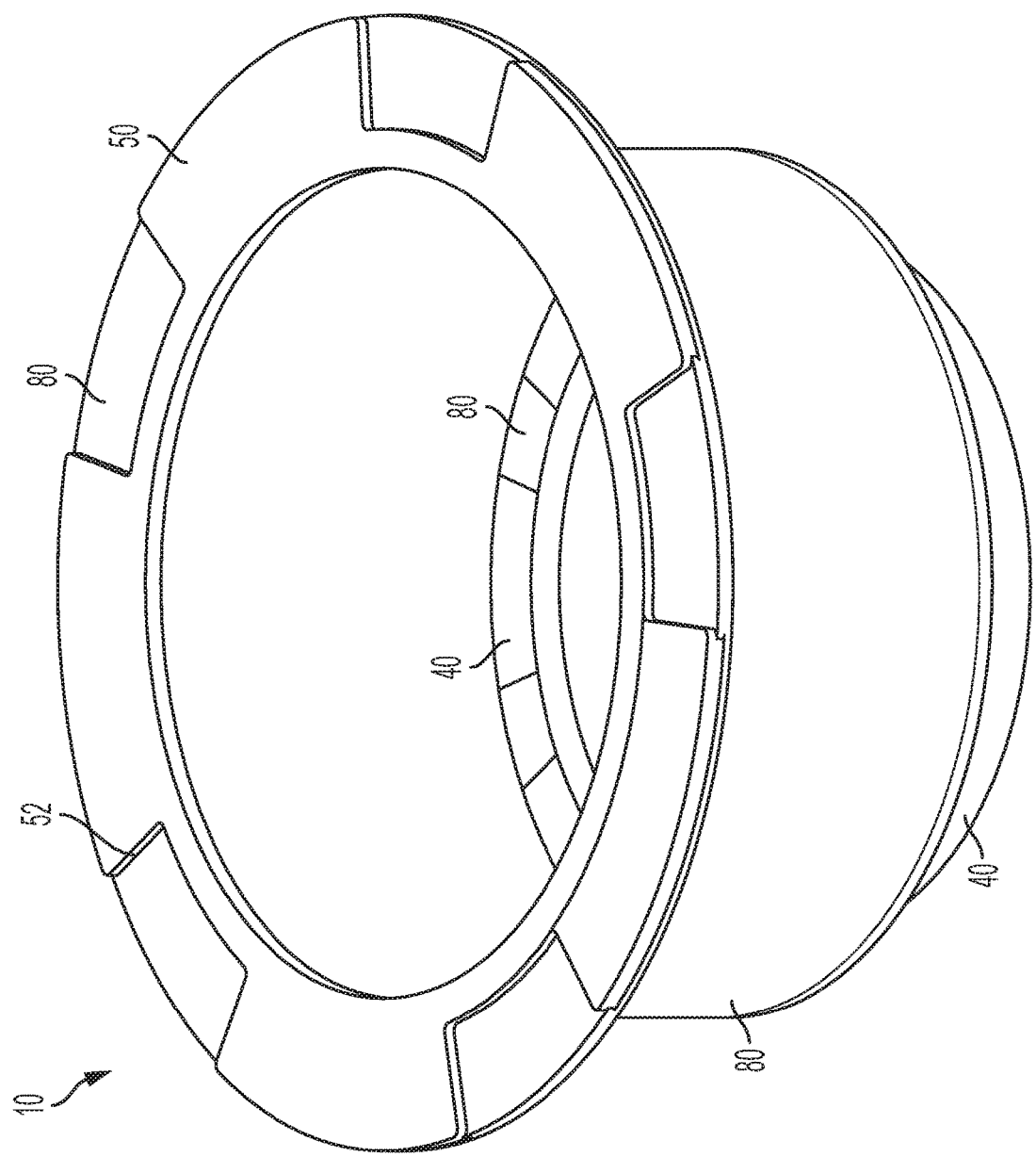

INTEGRATED ROTOR YOKE

CROSS-REFERENCE TO RELATED APPLICATIONS

This application claims priority to U.S. Provisional Patent Application No. 62/741,332, filed on Oct. 4, 2018 the disclosure of which is incorporated herein by reference in its entirety.

TECHNICAL FIELD

The present disclosure relates to a rotor used in a motor.

BACKGROUND

A typical magnetic motor includes a yoke which is a cylindrical structure which is provided to: mechanically support the poles; provide a path of low reluctance for flux; protect the motor; and/or form part of the magnetic circuit. A yoke may be used affix magnets thereto as well.

However, in electric motors, reducing the number and complexity of machined parts leads to a reduction in costs and manufacturing time. Further, it is advantageous to reduce the weight of moving motor components to diminish the moment of inertia of the motor when operating in dynamic situations for quick start and stop application.

SUMMARY

This disclosure relates in general to the rotor of an electric motor. More specifically, this disclosure pertains to a yoke for a permanent magnet rotor wherein an independent yoke formed with over-molded plastic and is secured to a magnet casing. The disclosure further relates to a method for producing the yoke and rotor.

In one embodiment of the present disclosure, a rotor yoke includes a casing attachment ring, a sensor ring, and an over-molded body disposed between the casing attachment ring and the sensor ring. The over-molded body couples the sensor ring to the casing attachment ring. The over-molded body may optionally defines one or more protrusions on an outer surface of the over-molded body. The aforementioned protrusion(s) are configured to balance the rotor yoke. Specifically, the protrusion or protrusions may be removable from the over-molded body so as to balance the rotor. Where there are a plurality of protrusions, these protrusions may be defined across an outer surface of the over-molded body. The casing attachment ring of the yoke is configured to be secured to one of a magnet casing or a magnet carrier.

In yet another embodiment of the present disclosure, a rotor assembly for a motor may be provided which includes a sensor ring, a casing attachment ring, an over-molded body and a magnet casing. The over-molded body may be disposed between the sensor ring and the casing attachment ring. The casing attachment ring and the magnet casing are affixed to one another. It is understood that the over-molded body configured to couple the sensor ring to the casing attachment ring.

The rotor assembly of the present embodiment may further optionally include at least one removable protrusion configured to balance the rotor yoke. Where there is a plurality of protrusions, the protrusions may optionally be defined across an outer surface of the over-molded body. Moreover, such protrusions may optionally be defined in a spiral pattern over the outer surface of the over-molded body. The protrusions may be removeable from the over-molded body so as to balance the rotor.

BRIEF DESCRIPTION OF THE DRAWINGS

One set of black and white line drawings and one set of color drawings are submitted for the following figures:

FIG. 1 is a perspective view of the yoke assembly.
FIG. 3 is a cross-sectional view taken along the line 3-3 of FIG. 2a.

DETAILED DESCRIPTION

Figure 2A:
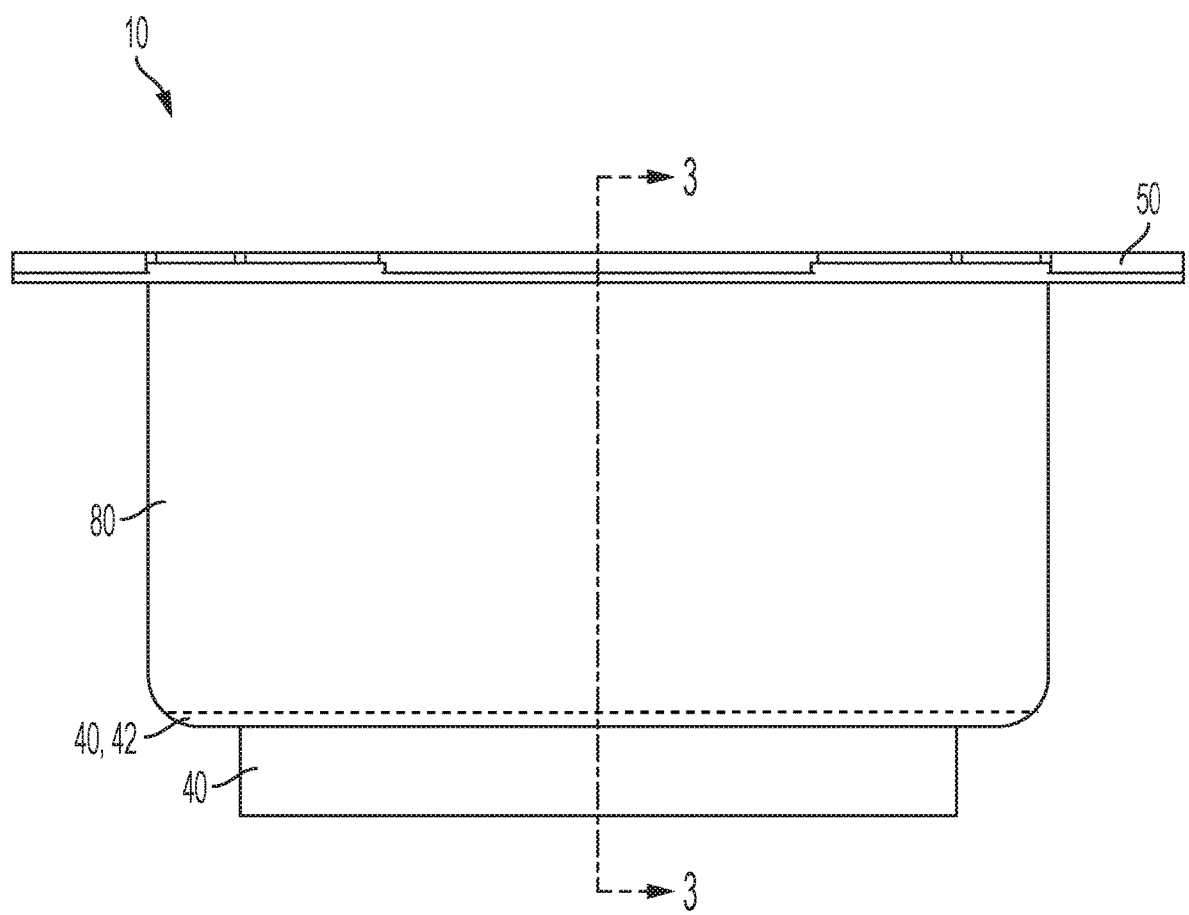
FIG. 2a is a side view of the yoke assembly of FIG. 1.
Figure 2B:
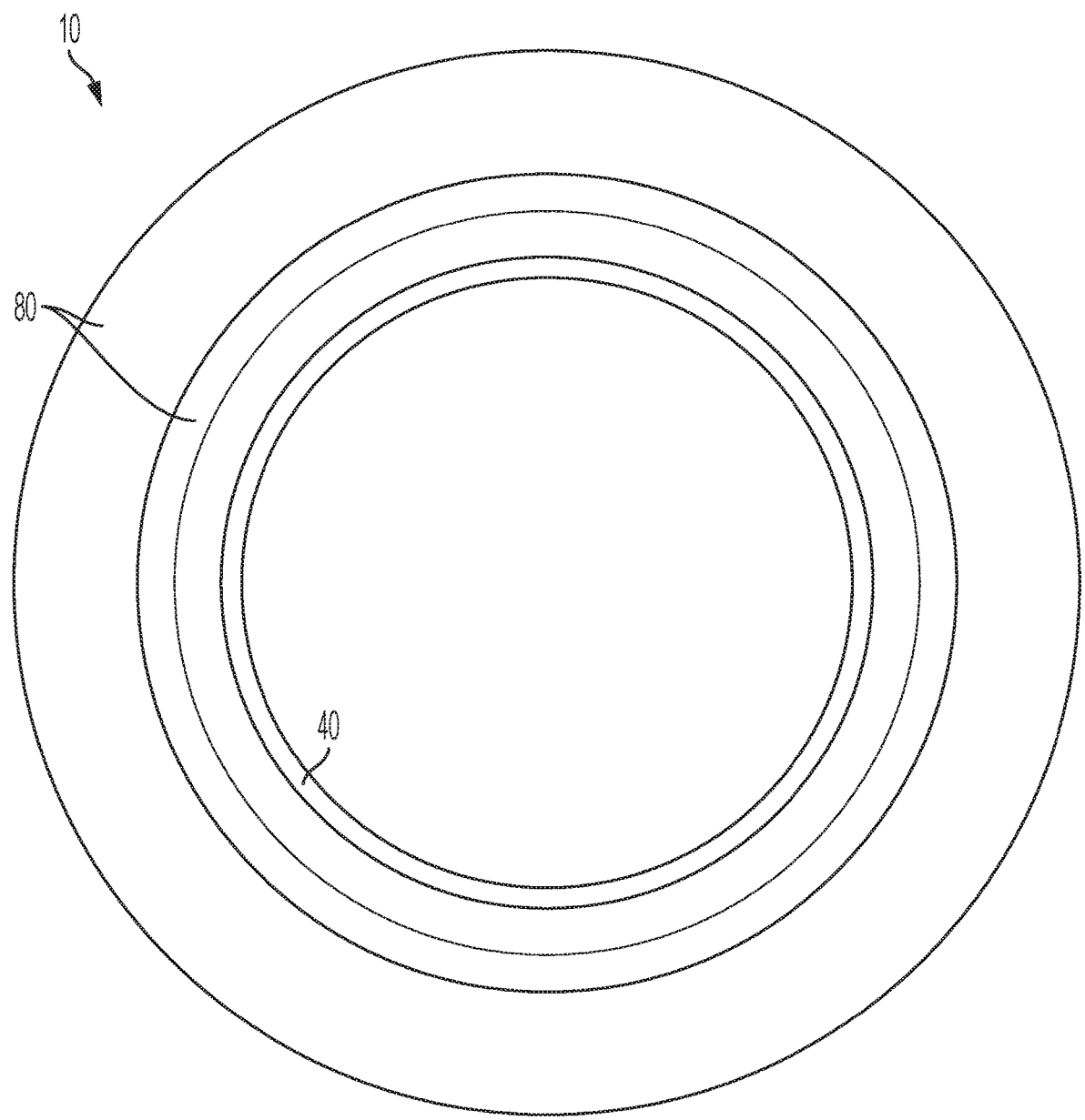
FIG. 2b is a bottom view of the yoke assembly of FIG. 1.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of", and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Referring now to the drawings, there is illustrated in FIG. 1 a yoke assembly, indicated generally at 10. The yoke assembly 10 is the top portion of a permanent magnet rotor driven by a stator (not shown). The yoke assembly 10 comprises a casing attachment ring 40 at a base of the yoke assembly 10. Casing attachment ring 40 is a generally annular shaped metallic support that is formed as a single part. The casing attachment ring 40 may be created as a machined part, sintered, deep-drawn, or by other manufacturing means. For example, the casing attachment ring 40 can be machined from a block of metal or formed from a sheet of metal and into an annular shape. Additionally, the casing attachment ring 40 may also have two ends welded to create the annular shape or may have interlocking tabs 42 as an attachment mechanism to an enable the casing attachment ring 40 to engage with the magnet support 32 or core 32. The casing attachment ring 40 may be press-fitted onto the magnet support 32 or core 32. (see FIG. 6c).

Figure 2C:
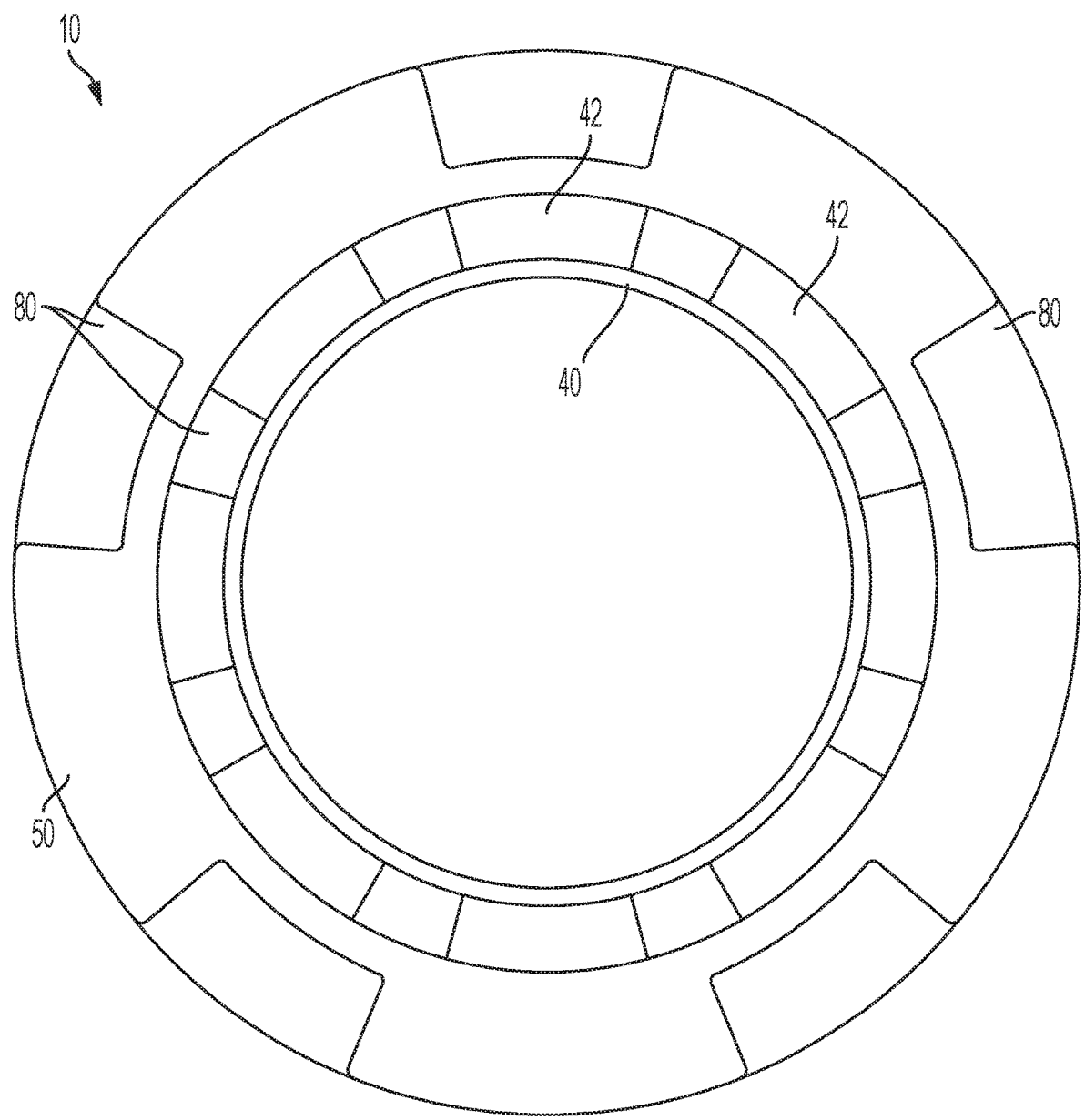
FIG. 2c is a top view of the yoke assembly of FIG. 1.
Figure 3:
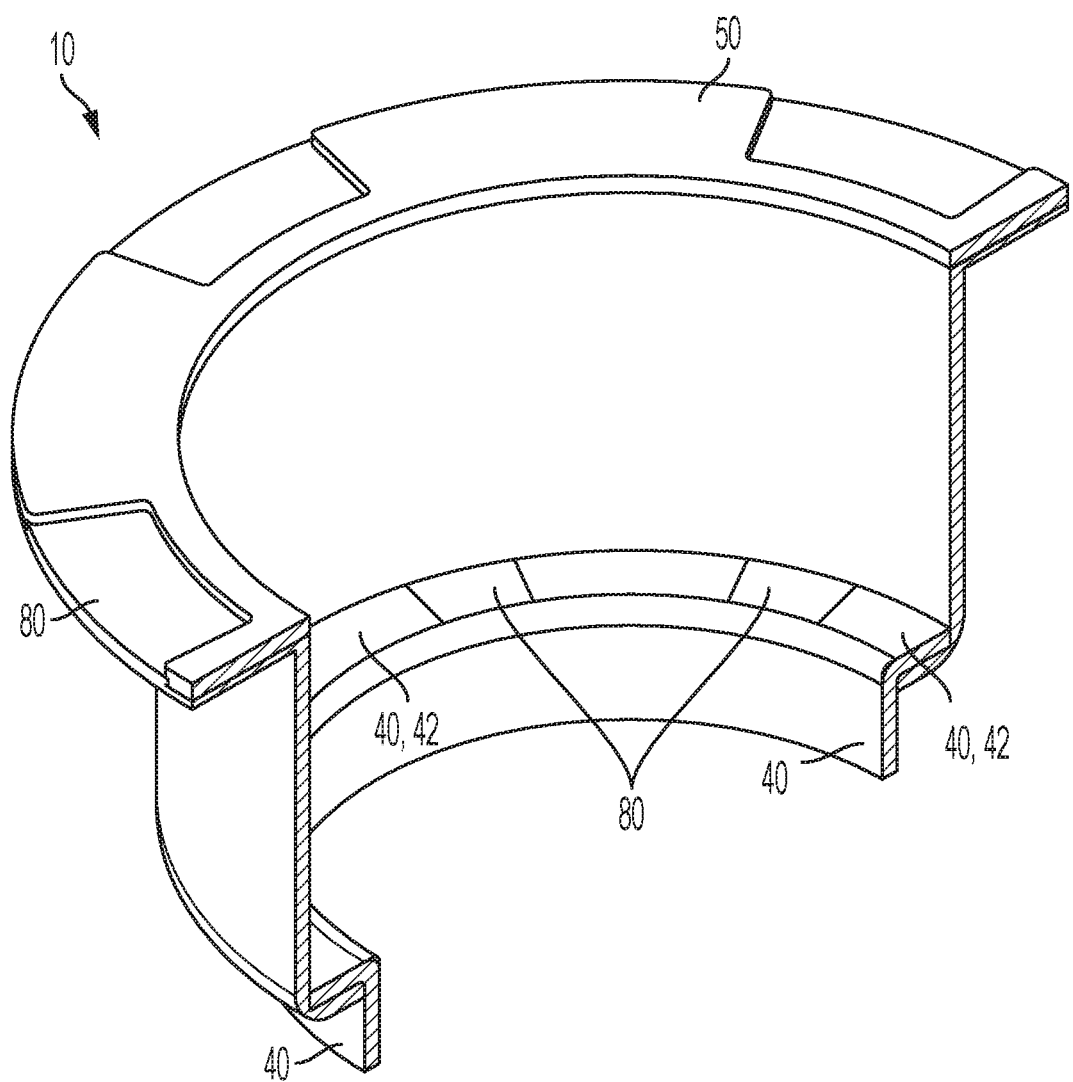
Figure 6A:
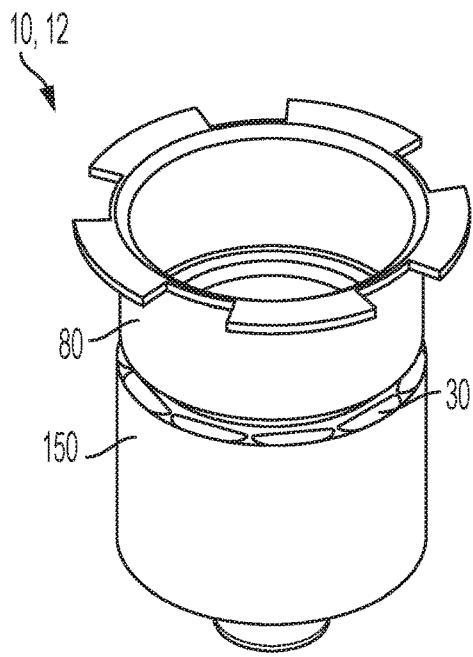
FIG. 6a is a perspective view of an example yoke and magnet casing of the present disclosure.
Figure 6B:
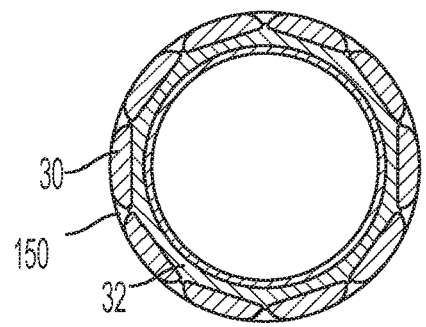
FIG. 6b is a cross sectional view of the magnet casing of FIG. 6C along line 6B-6B.
Figure 6C:
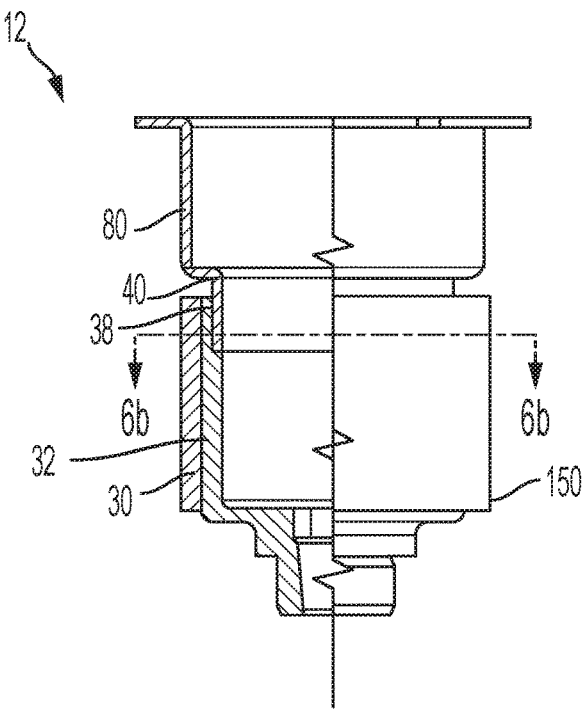
FIG. 6c is a side view of the yoke and magnet casing of FIG. 6A.

The casing attachment ring 40 is configured to attach to a magnet support 32 as shown in FIGS. 6a and 6. As best illustrated in FIGS. 2c and 3, the casing attachment ring 40 may comprise several tabs 42 on a top portion. As shown in FIG. 6c one end of the casing attachment ring 40 is pressed-fitted into the magnet casing 150. However, it is within the scope of the disclosure that other securing means between the casing attachment ring 40 and the magnet casing 150 can be utilized. As shown in FIG. 2a, the other end of the casing attachment ring 40 top portion is secured to a body 80.

As shown in FIG. 2a, the over-molded body 80 extends between the casing attachment ring 40 and a sensor ring 50. In production, casing attachment ring 40 and the sensor ring 50 are placed in a mold. The body 80 is then created via an over-molding process that connects the sensor ring 50 to the casing attachment ring 40.

Various elements of the yoke assembly 10 may have features that assist the over-molded body 80 to be secured to the elements. For example, the sensor ring 50 may have blind holes, tabs, or other features that allow the over-molded body 80 to further interface with the sensor ring 50.

In addition, it is within the scope of the disclosure that the amount of plastic used in the over-molded body 80 can be adjusted. For example, the thickness of the over-molded body 80 can be made thinner for weight reduction or increased for balance and strength purposes. Further, the over-molded body can be made of a variety of materials. While standard plastics or nylon impregnated plastics can be utilized, it is with the scope of the disclosure that other materials can be present in the over-molded body.

Figure 4:
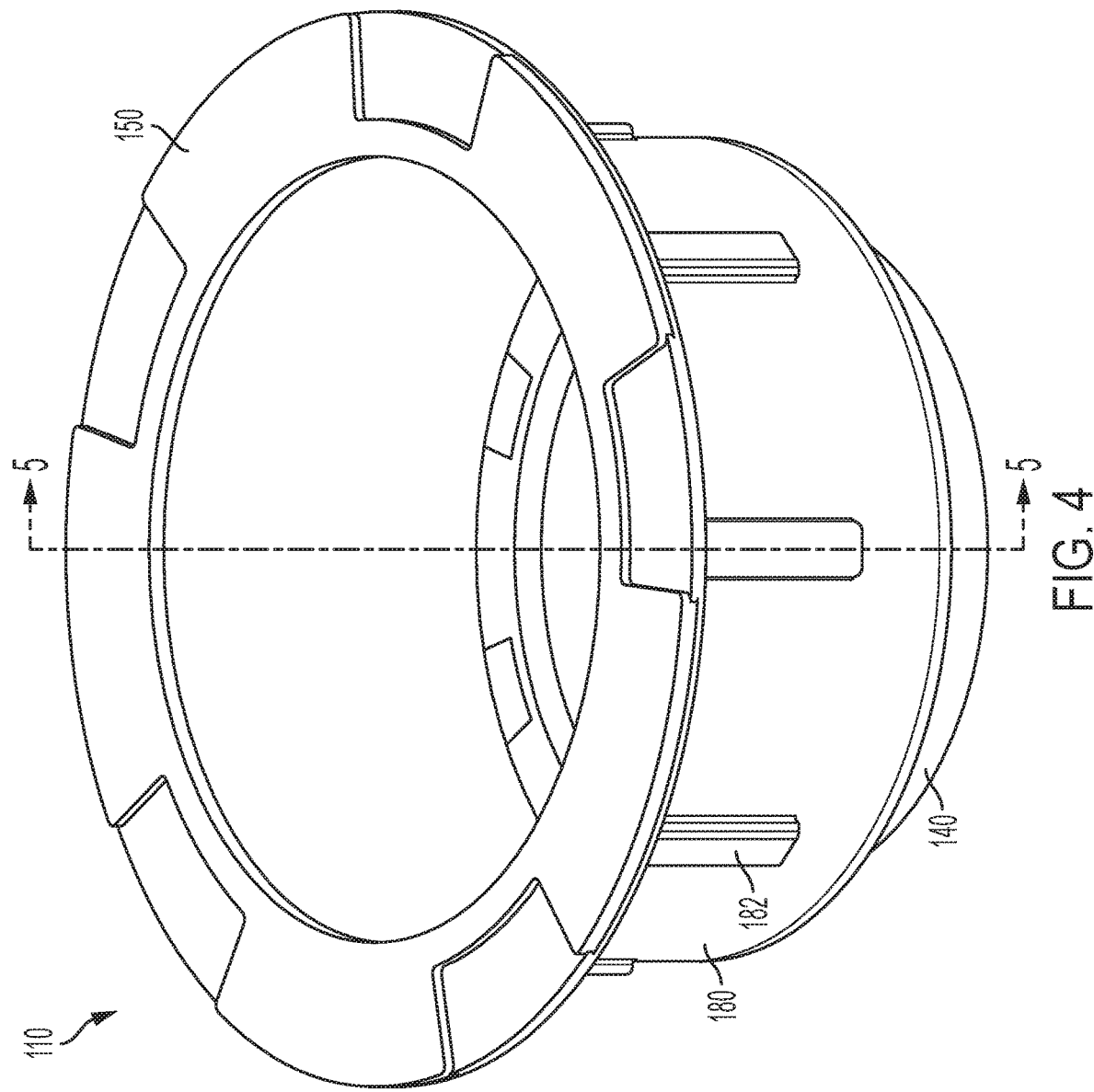
FIG. 4 is a perspective view of an alternative embodiment of the yoke assembly.
Figure 5:
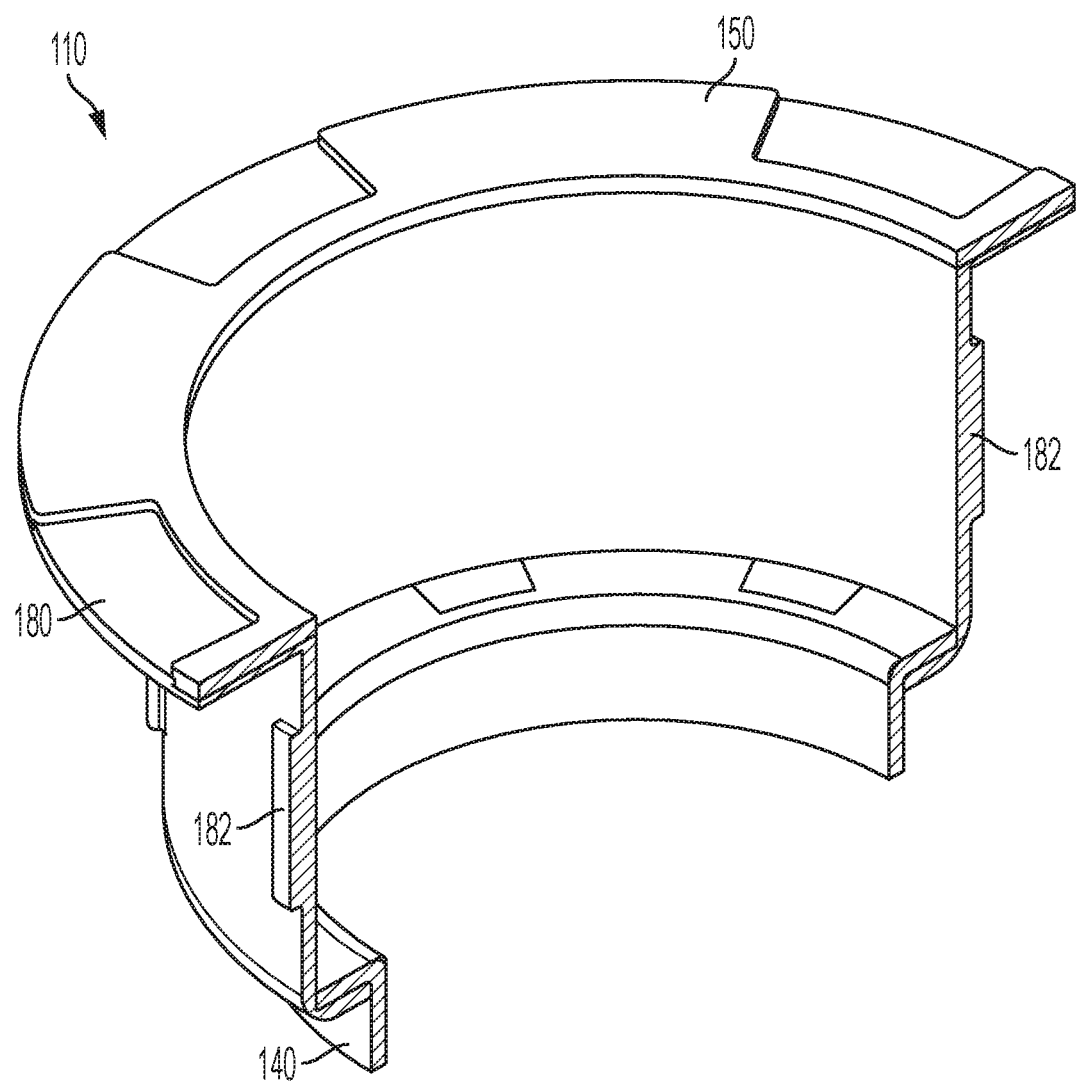
FIG. 5 is a cross-sectional view taken along the line 5-5 of FIG. 4.

The over-molded body 80 can further have additional elements or surface textures to allow balancing. As shown in FIG. 4, protrusions 182 can be provided on the outer surface of the over-molded body 180 that can then be removed to varying degrees to balance the yoke assembly 10, and in turn the entire rotor assembly 12. The protrusions 182 are shown in a rectangular shape in FIGS. 4-5. The protrusions 182 may optionally be removable to help balance the rotor. However, such protrusions 182 may be provided in various different shapes, such as, but not limited to dome-shaped protrusions (shown as elements 182 in FIG. 7). Alternatively, grooves or slots (not shown) may be made along the outer surface of the over-molded body 80 for similar balancing purposes.

Referring now to FIGS. 6a-6c, the yoke may be press-fitted onto the magnet casing (at the interface 38 (FIG. 6C) between the core 32 or magnet support 32 and the casing attachment ring 40) in order to form the rotor assembly 12. FIG. 6a is a perspective view of an example yoke and magnet casing of the present disclosure while FIG. 6b is a cross sectional view of the magnet casing of FIG. 6C along line 6B-6B. FIG. 6c is a side view of the yoke and magnet casing of FIG. 6A. As indicated, the casing attachment ring 40 may have interlocking tabs 42 as an attachment mechanism to an enable the casing attachment ring 40 to engage with the magnet support 32 or core 32. The casing attachment ring 40 may be press-fitted onto the magnet support 32 or core 32. (see FIG. 6c). As shown in FIG. 6b, the magnets 30 may be affixed to the magnet support (or core) 32 as shown.

Figure 7:
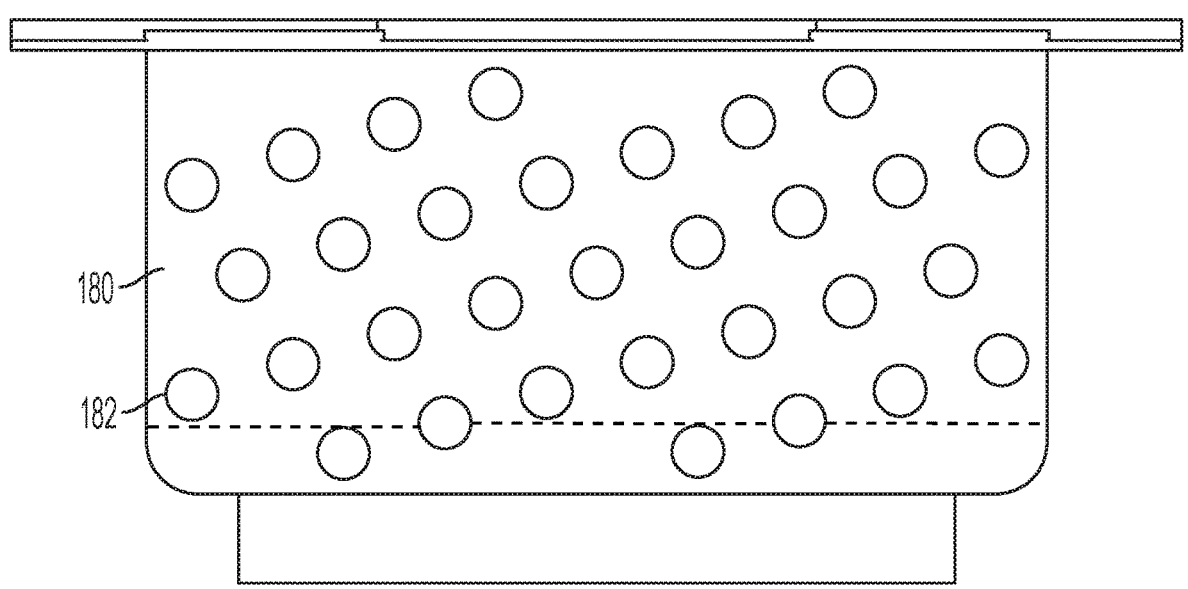
FIG. 7 is a perspective view of an additional alternative embodiment of the yoke assembly showing a plurality of spiral dynamic balancing protrusions.

In another embodiment, as shown in FIG. 7, the balancing protrusions 182 can be arraigned in a spiral shape (as dome shaped protrusions 182) around the outer surface of the body 180 for improved balancing. These protrusions 182 may be removable. In addition, it is within the scope of the disclosure that the yoke assembly 10 may be balanced using additive methods.

In addition, the body over-molded body 80 can be adjusted as to how much engagement it has with each individual element. For example, the over-molded body 80 can extend to be flush with a top surface of the sensor ring 50 (as shown in FIG. 2a) or have a gap 52 from the top surface of the sensor ring 50, as shown in FIG. 1. This further allows adjustment of the weight of the overall yoke assembly 10 as well as allowing mitigation of any fan effects created by the rotating sensor ring 50.

As best shown in FIG. 2c, the sensor ring 50 is a generally annular shape with a planar body. The sensor ring 50 has a plurality of cut-outs 54 at the planar body portion which allows a sensor of the motor to determine rotation and/or position of the yoke assembly 10. The sensor ring 50 is a metallic structure and can be formed by a variety of means. For example, the sensor ring 50 can be formed by a stamping process. Other yoke and rotor assemblies have previously formed a sensor ring as an integral part of a rotor body. These rotor assemblies are often deep-drawn to create the body. However, this process often causes uneven thickness of the sensor ring due to necking of the metal in a deep-draw process. This can have negative consequences in obtaining a signal from the sensor ring. In the present disclosure, a stamping process will result in a uniform thickness that is advantageous for signal reading of the sensor ring 50.

The modular design of the present disclosure has further advantages over existing yoke and rotor assemblies that have an integral body, rotor shaft, and sensor ring. For example, the sensor ring 50 can be made of a material optimized for the sensor while the casing attachment ring 40 can be made of a different material optimized for strength or weight. Further, the components can be individually changed and optimized without requiring a change to the entire assembly.

The principle and mode of operation of this disclosure have been explained and illustrated in its preferred embodiment. However, it must be understood that this disclosure may be practiced otherwise than as specifically explained and illustrated without departing from its spirit or scope.

What is claimed is:

1. A rotor yoke comprising:
a casing attachment ring configured to connect the rotor yoke to one of a magnet casing or a magnet carrier of a motor connected to an output shaft of the motor so that the rotor yoke is spaced from the output shaft;
a sensor ring axially spaced from the casing attachment ring; and
an over-molded body axially extending between the casing attachment ring and the sensor ring;
wherein the over-molded body couples the sensor ring to the casing attachment ring so that the casing attachment ring connects the sensor ring to the one of the magnet casing or magnet carrier.

2. The rotor yoke according to claim 1 wherein the over-molded body has at least one radially extending protrusion on a radially outer surface of the over-molded body and the at least one protrusion is configured to balance the rotor yoke.

3. The rotor yoke according to claim 2 wherein the at least one protrusion is removable from the over-molded body.

4. The rotor yoke according to claim 2 wherein a plurality of protrusions is defined on the radially outer surface of the over-molded body.

5. A rotor assembly comprising:
a sensor ring;
a casing attachment ring axially spaced from the sensor ring;
an over-molded body axially extending between the sensor ring and the casing attachment ring; and
a magnet casing affixed to the casing attachment ring, the magnet casing being configured to be connected to an output shaft of a motor so that the sensor ring, the casing attachment ring and over-molded body are spaced from the output shaft;
wherein the over-molded body is configured to couple the sensor ring to the casing attachment ring so that the casing attachment ring connects the sensor ring to the one of the magnet casing or magnet carrier.

6. The rotor assembly according to claim 5, further comprising at least one removable protrusion on a radially outer surface of the over-molded body configured to balance the rotor.

7. The rotor assembly according to claim 6, further wherein the over-molded body includes a plurality of removable protrusions defined in a spiral arrangement on the radially outer surface of the over-molded body and the plurality of removable protrusions are configured to balance the rotor.

8. The rotor assembly according to claim 4, wherein the plurality of protrusions have a spiral arrangement on the radially outer surface of the over-molded body.

* * * * *